June 24, 1947. E. A. HALLSTRAND 2,422,961
ROTATING JOINT FOR CONCENTRIC CABLES
Filed March 24, 1943
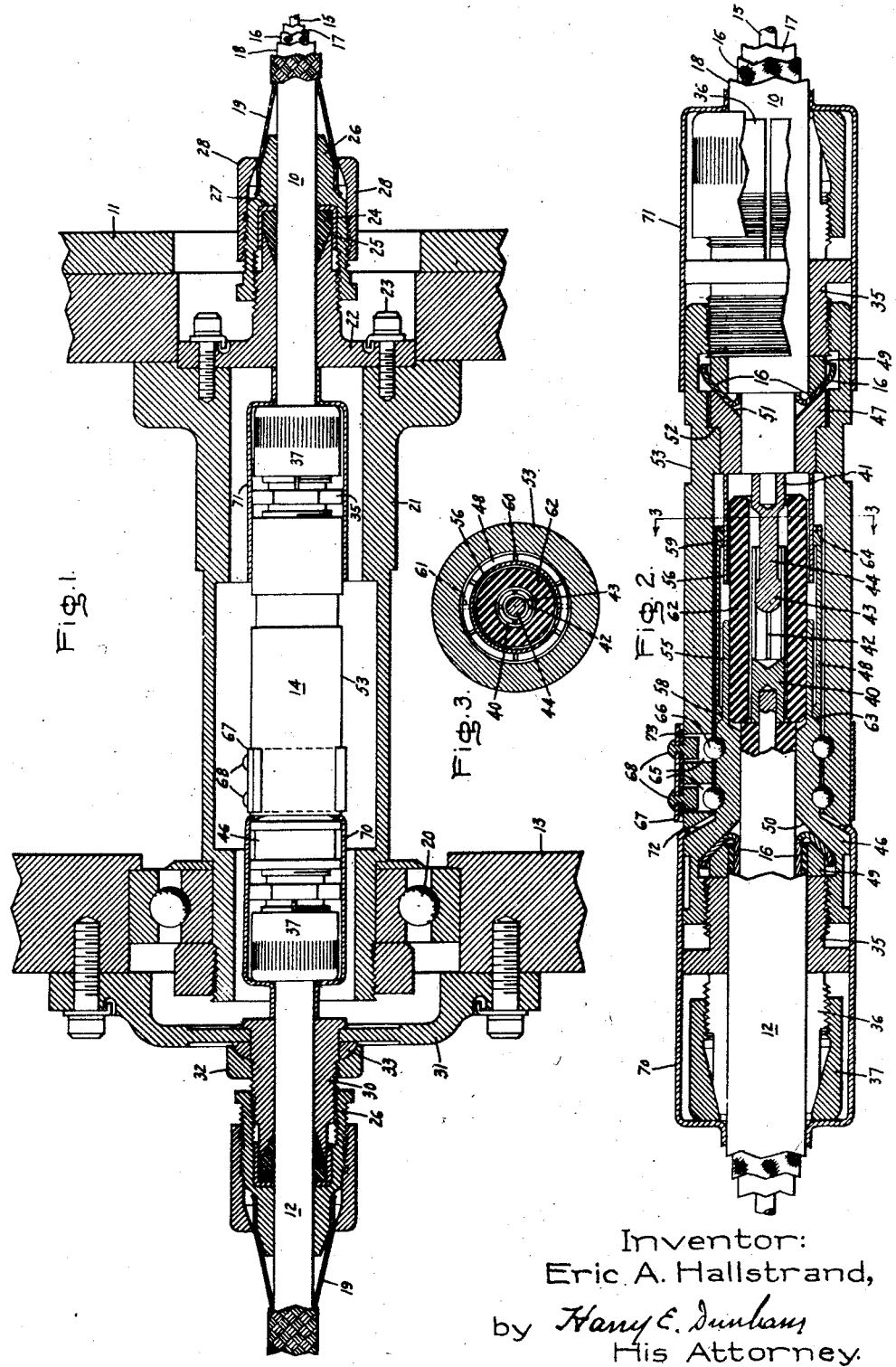
Inventor:
Eric A. Hallstrand,
by Harry E. Dunham
His Attorney.

Patented June 24, 1947

2,422,961

UNITED STATES PATENT OFFICE 2,422,961

ROTATING JOINT FOR CONCENTRIC CABLES

Eric A. Hallstrand, Stratford, Conn., assignor to General Electric Company, a corporation of New York Application March 24, 1943, Serial No. 480,266

8 Claims. (Cl. 173—324)

My invention relates to transmission lines of the concentric cable type and it has for its object to provide an improved coupling arrangement between rotatable sections of such a line.

Another object of my invention is to provide an improved coupling means for rotatable sections of a concentric transmission line which assures continuous operation of the circuits and apparatus connected thereto despite substantial misalignment of the sections.

A further object is to provide an improved rotating joint for concentric transmission lines which may be readily constructed from available materials and which is easily assembled and disassembled.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 shows a portion of an apparatus embodying the rotating joint of my invention; Fig. 2 is an enlarged view partly in section of a portion of the joint of Fig. 1; and Fig. 3 is a sectional view along the line 3—3 of Fig. 2.

Referring to Fig. 1 of the drawing, the upper portion 10 of the concentric transmission line is rigidly attached to a rotating frame member 11 which may, for example, be a part of a rotating antenna structure, the lower portion 12 of the transmission line is preferably rigidly supported in a stationary frame member 13, and the two sections are joined by the rotating joint 14.

The cable 10 comprises a solid centrally disposed inner conductor 15 and a concentric outer conductor 16 which preferably is of a flexible braided material, the inner conductor 15 and outer conductor 16 being separated by a solid dielectric material 17 of the usual type. The outer conductor 16 is likewise surrounded by a solid dielectric material 18 and the cable thus formed is enclosed in a protective armor or sheath 19 of braided steel wire.

The frame member 11 is shown as having a hollow shaft portion 21 which is rotatably supported by any suitable bearing structure, such as the ball bearing support 20 secured to the stationary member 13. In order rigidly to attach the upper portion 10 of the concentric cable to the frame member 11, a cover member 22 is provided and is fastened to the upper portion of the hollow shaft 21 by means of bolts 23. The cover member 22 is provided with a central bore having a diameter substantially equal to the outer diameter of the layer of insulation 18 on the concentric cable so that the portion of the cable beneath the protective armor 19 may be passed therethrough. The central bore of cover 22 is tapered at its upper portion for the reception of a ferrule 24 of any suitable heat-resisting molded compound, such as vulcanized rubber. A cap 25 surrounds the ferrule 24 in order to retain it within the above mentioned flared portion of the central bore of cover 22 and a housing member 26 is provided in order to secure ferrule 24 and cap member 25 to the cover 22. Housing 26 likewise has a central bore whose diameter is substantially equal to the outer diameter of the layer of insulation 18 and a shoulder 27 for engaging the cap 25. The lower end of housing 26 is internally threaded for engagement with external threads on the cover 22. As the internal threads of housing 26 advance along the external threads of cover 22, the shoulder 27 causes cap 25 to compress ferrule 24, the pressure causing it to flow about the outer layer of insulation 18 and to secure rigidly the cable 10 to cover 22.

In order to prevent any sharp bending of the cable 10 at its point of entry into the housing 26, which bending would tend to cut the layers of insulation 17, 18 and to cause short-circuiting of the conductors of the cable, the braided armor 19 is spread apart at this point along the cable 10 and is clamped to the housing 26. This spreading apart of the armor 19 at this point tends to make the cable more rigid and to permit only gradual bending of the cable. The outer surface of the upper end of housing 26 and the inner surface of the upper end of nut 28 have cooperating beveled surfaces between which the spread-apart portion of armor 19 is clamped by means of cooperating threads on housing 26 and nut 28.

The lower or fixed section 12 of the concentric transmission line is rigidly attached to stationary member 13 by means which, except for a few members, are identical with those described in connection with the rotatable section 10 and corresponding elements of the two sections are identified by corresponding reference numerals. In the joint between fixed section 12 and stationary member 13, housing member 26 is threadedly attached to a stud 30 which is clamped to cover 31 by means of nut 32. A gasket 33 of any suitable material, such as lead, is provided between nut 32 and cover 31 in order to prevent any leakage of moisture into the stationary member 13.

The rotating joint 14 is shown in detail in Fig. 2 and comprises a pair of bushings 35 for engaging the outer surface of the insulating layer 18 of both cables 10 and 12. These bushings 35 are provided with split chuck portions 36 which may be caused to grip the insulation 18 by means of caps 37, the internal surfaces of these caps being beveled to engage beveled surfaces on the split chuck portions 36 whereby, as the caps 37 are screwed on bushings 35, the split chuck portions 36 are wedged tightly against the layer of insulation 18.

The inner conductor 15 of the lower or stationary portion 12 of the transmission line is secured, as by soldering or brazing, to the base portion of a female contact member 40 and the inner conductor 15 of the upper or rotating section 10 of the transmission line is similarly electrically connected to the base portion of a male contact member 41. Contact member 40 is preferably formed of a spring-like material, such as beryllium copper, and is provided at its upper or sheath portion with a plurality of longitudinal slots 42 to form spring-like fingers for rotatably engaging an enlarged head portion 43 on male contact 41. Also, the base and head portions of contact 41 are joined by a portion 44 of reduced diameter. Such construction permits considerable misalignment between sections 10 and 12 of the transmission line, for the enlarged head portion 43 functions as a ball contact to assure continuous contact between the inner conductors 15 despite any angular displacement of the rotating section of the line with respect to the fixed section. To this end, the contact 41 preferably is formed of a bearing material, such as phosphor bronze, for example.

Continuous conduction between the outer conductors 17 of sections 10 and 12 of the transmission line is secured by means of the conductive tubular housing members 46 and 47 and sleeve member 48. Contact rings 49 are placed in abutting engagement with the ends of bushings 35 and the outer conductive braids 16 are spread outwardly and rearwardly over these contact rings. Housing 46 is provided with a flared inner surface 50 for engaging conductor 16 and pressing it against the contact rings. Cooperating threads on housing 46 and bushing 35 provide means for clamping conductor 16 between contact rings 49 and flared surface 50. Housing member 47 likewise has an inner flared surface 51 for engaging the outer conductor 16 of section 10 of the transmission line. Housing member 47 is provided also with a shoulder portion 52 for engaging a cooperating shoulder portion on the inner surface of the tubular cover member 53. Cooperating threads on the tubular cover member 53 and the bushing 35 surrounding section 10 of the transmission line provide means for clamping conductor 16 between surfaces 51 and contact ring 49, thus forming a solderless conductive connection at this point.

Adjacent ends 55 and 56 of the housing members 46 and 47 are spaced apart longitudinally by a substantial distance and sleeve 48 comprises means for conductively connecting these adjacent ends of these housing members. A pair of bearing surfaces 58 and 59 are provided on the inner surface of sleeve 48 to function as means for conductively connecting the housing members 46 and 47 through sleeve 48. Sleeve 48 preferably is formed of a spring-like material, such as phosphor bronze, and, as may be seen in Fig. 3, is provided on its right-hand end with a plurality of longitudinal slots 60 to form a plurality of spring-like fingers for positively contacting the outer surface of housing 47. The left-hand portion of sleeve 48 may likewise be provided with a pair of longitudinal slots 61 whereby the two halves of the bearing surface 58 may be spread apart and slipped over the outer surface of housing 46. Thereafter, the spring material of the sleeve causes the surface 58 to engage frictionally and grip housing 46 tightly, restricting rotation between these elements. The edges of bearing surfaces 58 and 59 are chamfered, as indicated by numerals 63, 64, so that the chamfered portion 63 of bearing surface 58 abuts against a corresponding surface on housing member 46 and the chamfered portion 64 of bearing surface 59 permits a certain degree of misalignment between housings 46 and 47. Also, the outer surface of housing 47 may be silver plated to provide a decreased contact resistance between bearing surface 59 and member 47. In order properly to insulate housing members 46 and 47 from contacts 40 and 41, a sleeve-like insulator 62 is provided between these respective pairs of contact making members. Insulator 62 may be formed from any suitable type of molded dielectric material, for example, a ceramic bonded mica insulating material such as Mycalex.

In order to minimize friction, as well as to limit longitudinal displacement between housing member 46 and cover member 53 and to provide a structure which permits a certain degree of misalignment between the cables 10 and 12, a bearing structure of the ball bearing type is provided between housing 46 and cover member 53. The races for this ball bearing structure preferably are formed integrally with the outer surface of member 46 and the inner surface of cover member 53. A pair of openings 65 is provided in the cover member 53 for the insertion of the balls 66 into the races. A cover 67 of spring-like material slips over the outer surface of cover member 53 and carries a pair of pin members 68 which fit into the openings 65 and maintain the balls 66 in the race structure.

In order to prevent the entrance of any moisture into the coupling arrangement shown, covers or boots 70 and 71 of any suitable material, such as neoprene, are provided to engage tightly the insulation 18 and to extend over all threaded portions of the coupling through which moisture might enter. Cover 70 is provided with a beaded portion 72 which extends into the joint between housing 46 and cover member 53. Also, washers 73 of suitable material, such as rubber or neoprene, surround pin members 68 to lie between cover 67 and the outer surface of member 53 and seal the opening 65 against the entrance of moisture.

It is thus seen that my invention provides a rotating joint for a concentric type cable which is readily constructed from available materials and is easily assembled. Moreover, by properly dimensioning the contacts 40 and 41, the housing members 46 and 47, and the sleeve 48 and by choosing a suitable dielectric material for the insulator 62, objectionable discontinuities in the impedance of the transmission line may be avoided. The rotating contact arrangement comprising the contacts 40 and 41 and the housing members 46 and 47 and the sleeve 48 form a structure which permits a considerable degree of misalignment between adjacent ends of the transmission line and yet which maintains the contact resistance between rotating parts substantially constant during operation over a considerable period of time. The structure, moreover, is one which avoids the introduction of any undesirable noise voltages into radio circuits connected thereto. All contact portions of the rotating joint are well protected from objectionable changes in atmospheric conditions without introducing any considerable torque load on the rotating equipment to which the cable is connected.

While I have shown a particular embodiment of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. In a rotating coupling for adjacent sections of a transmission line having inner and outer conductors coaxially disposed, the combination of, rotatable means connecting the inner conductors of said sections, tubular housing members conductively connected to the outer conductors of said sections and having their adjacent ends spaced apart by a substantial distance, a sleeve member surrounding said adjacent ends and conductively connecting said housing members, said sleeve member having one of its ends frictionally contacting the outer surface of one of said housing members and having a plurality of contact members at its opposite end rotatably to engage the outer surface of the other of said housing members, and means enclosing said housing members and said sleeve member comprising rotatable means journalled on one of said housing members.

2. In a rotating coupling for adjacent sections of a transmission line having inner and outer conductors coaxially disposed, the combination of, rotatable means connecting the inner conductors of said sections, tubular housing members conductively connected to the outer conductors of said sections and having their adjacent ends spaced apart by a substantial distance, a sleeve member surrounding said adjacent ends and conductively connecting said housing members, said sleeve member having one of its ends frictionally contacting the outer surface of one of said housing members and having a plurality of contact members at its opposite end rotatably to engage the outer surface of the other of said housing members, means to limit longitudinal displacement of said sections, and means enclosing said housing members and said sleeve member comprising rotatable means journalled on one of said housing members.

3. A coupling for rotatable sections of a concentric transmission line comprising a slotted tubular member connected to the inner conductor of one of said sections, a pin member connected to the inner conductor of the other of said sections and extending within said tubular member, said pin member having means rotatably engaging the inner surface of said tubular member, tubular housing members connected to said outer conductors, said housing members having portions of equal outer diameters and the adjacent ends of said housing members being spaced apart by a substantial distance, and a sleeve member encircling said adjacent ends and conductively connecting said housing members, said sleeve member having one end frictionally engaging one of said housing members and having a plurality of finger members at its opposite end for rotatably engaging the outer surface of the other of said housing members, and means to prevent longitudinal movement between said sections.

4. In a rotating coupling for adjacent sections of a transmission line having an inner conductor and a tubular outer conductor concentrically disposed with respect to said inner conductor, the combination of, rotatable means connecting the inner conductors of said sections, said tubular outer conductors having their adjacent ends spaced apart by a substantial distance, and a sleeve member surrounding said adjacent ends and conductively connecting said outer conductors, said sleeve member having one of its ends frictionally contacting the outer surface of one of said outer conductors and having a plurality of contact members at its opposite end rotatably to engage the outer surface of the other of said outer conductors, said sleeve member having a portion of enlarged inner diameter between the said ends thereof to permit a limited degree of misalignment of said sections.

5. A tubular electrical connection to be interposed in a tubular conductor including an outer tubular section, means at the outer end of the outer section making mechanical and electrical connection with one part of the conductor, an inner tubular section entering the inner end of the outer section, the sections having registering annular grooves defining annular races, balls in the races connecting the sections against separation and for free relative rotation, a sleeve fixed in the outer section, a tubular contact engaging the sleeve and engaging the inner portion of the inner section to maintain the sections in electrical connection, a tubular insulator retained by the sections within the sleeve and the inner portion of the inner section, and a contact device within the insulator for joining sections of an inner conductor and including separable male and female parts.

6. A tubular electrical connection to be interposed in a tubular conductor including an outer tubular section, means at the outer end of the outer section making mechanical and electrical connection with one part of the conductor, an inner tubular section entering the inner end of the outer section, means at the outer end of the inner section making mechanical and electrical connection with the other part of the conductor, the sections having registering annular grooves defining annular races, balls in the races connecting the sections against separation and for free relative rotation, a sleeve fixed in the outer section, a tubular contact connected with the sleeve and engaging the inner portion of the inner section to maintain the sections in electrical connection, and rotary contact means within and insulated from the sleeve and inner section for connecting inner conductors.

7. A tubular electrical connection to be interposed in a tubular conductor including, an outer tubular section, means at the outer end of the outer section making mechanical and electrical connection with one part of the conductor, an inner tubular section entering the inner end of the outer section, means at the outer end of the inner section making mechanical and electrical connection with the other part of the conductor, each of said means including a split tubular element to receive the conductor and a collar for clamping the split element onto the conductor, means joining the sections for free relative rotation, and means electrically connecting the sections.

8. A tubular electrical connection to be interposed in a tubular conductor including, an outer tubular section, means at the outer end of the outer section making mechanical and electrical connection with one part of the conductor, an inner tubular section entering the inner end of the outer section, means at the outer end of the inner section making mechanical and electrical connection with the other part of the conductor, each of said means including a split tubular element threaded to one of the sections to receive the conductor and a collar for clamping the split element onto the conductor, means joining the sections for free relative rotation, and means electrically connecting the sections.

ERIC A. HALLSTRAND.

REFERENCES CITED

The following references are of record in the file of this patent:

UNITED STATES PATENTS

| Number | Name | Date |
| --- | --- | --- |
| 870,490 | Burbank | Nov. 5, 1907 |
| 1,963,792 | Kimbell | June 19, 1934 |
| 2,064,585 | Atienza | Dec. 15, 1936 |